O. K. SNYDER AND C. H. KENRICH.
STEERING WHEEL.
APPLICATION FILED OCT. 7, 1918.
1,381,025.
Patented June 7, 1921.
2 SHEETS—SHEET 1.
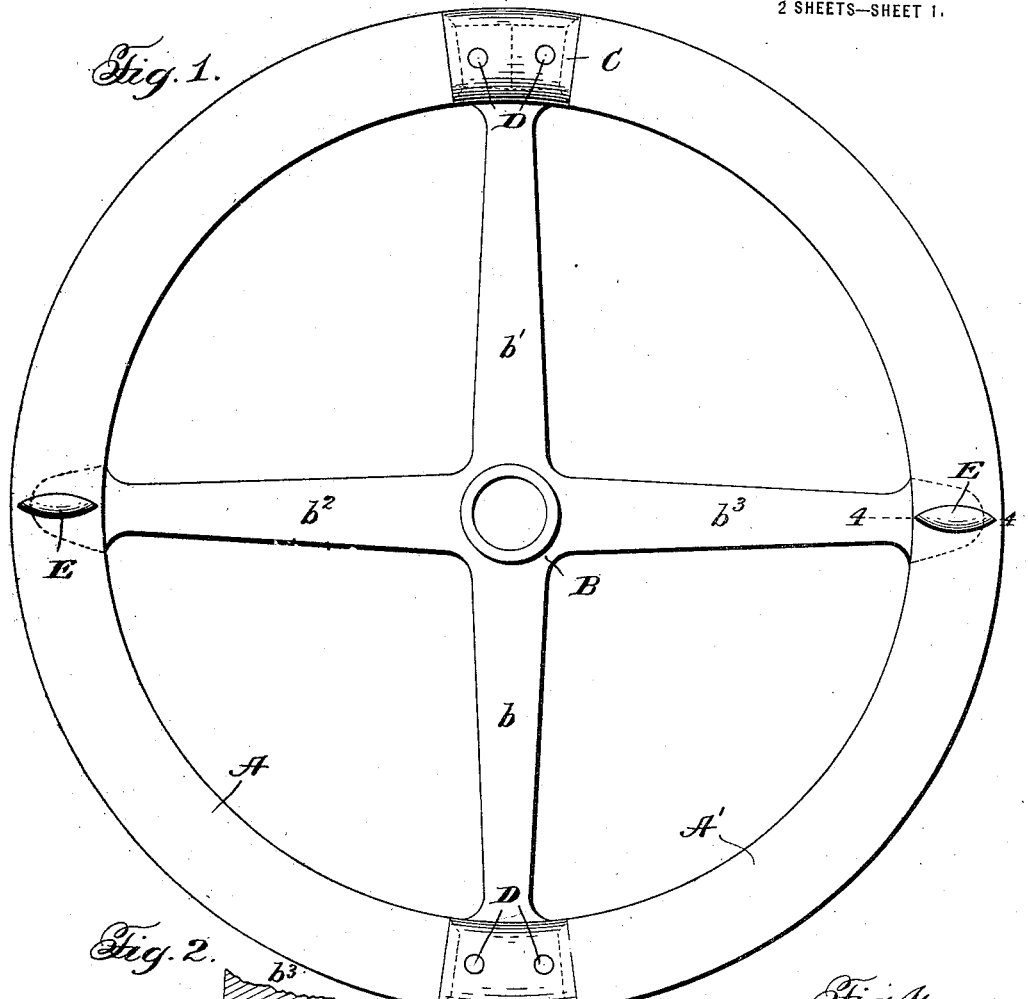
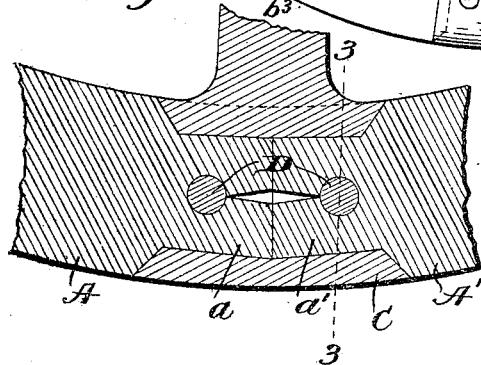
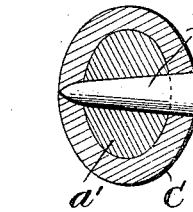
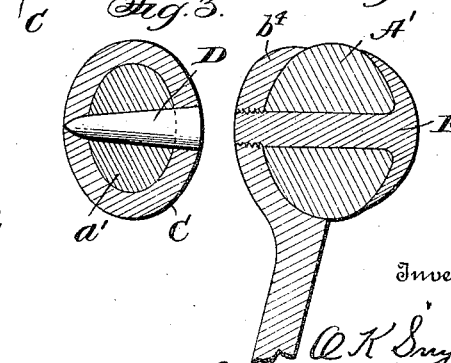

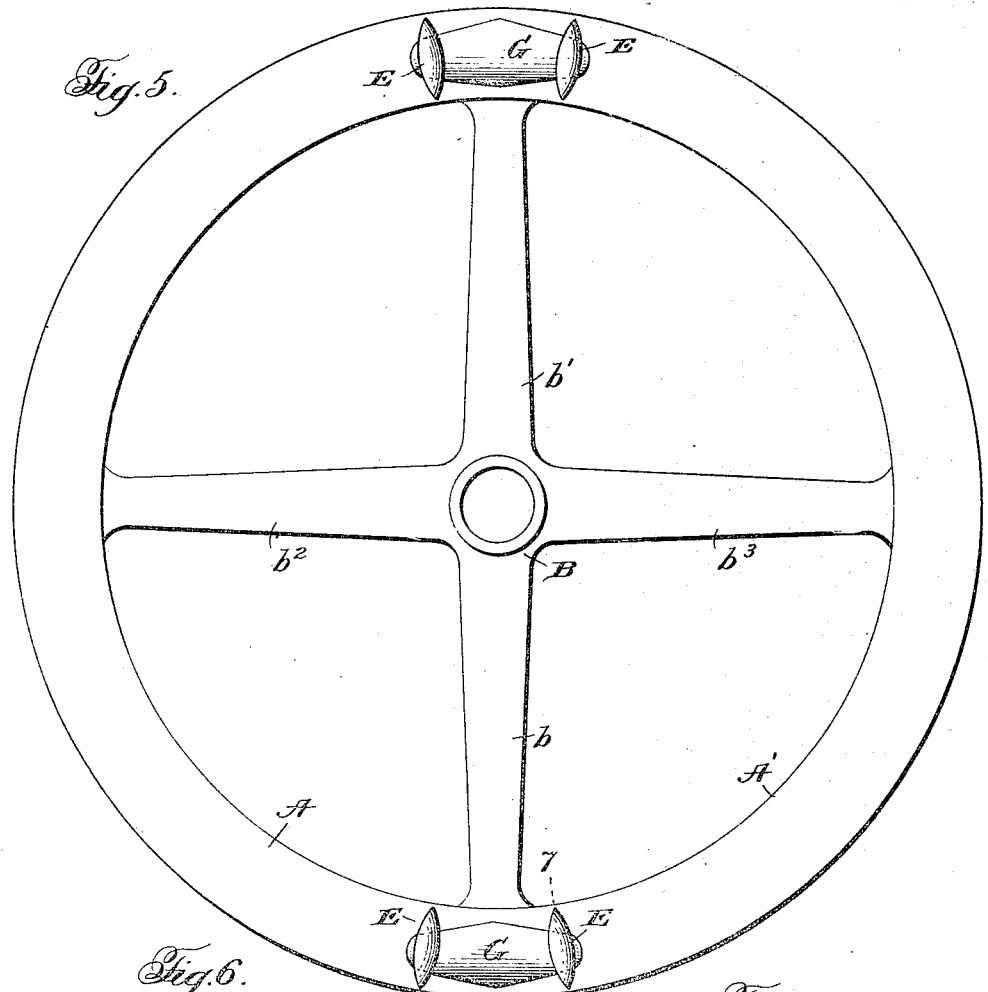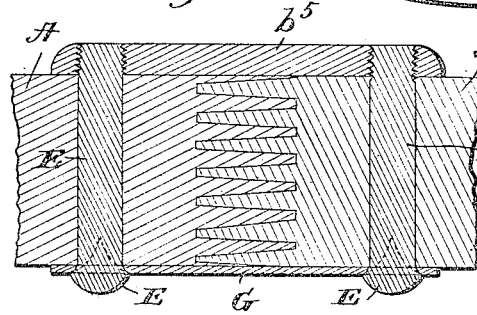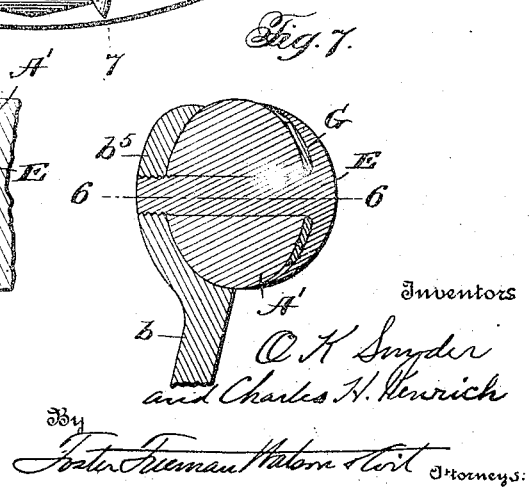

UNITED STATES PATENT OFFICE.

O K SNYDER AND CHARLES H. KENRICH, OF ONAWAY, MICHIGAN, ASSIGNORS TO THE AMERICAN WOOD RIM COMPANY, OF ONAWAY, MICHIGAN, A CORPORATION OF WEST VIRGINIA.

STEERING-WHEEL.

1,381,025.

Specification of Letters Patent.   Patented June 7, 1921.

Application filed October 7, 1918. Serial No. 257,308.

*To all whom it may concern:*

Be it known that we, O K SNYDER and CHARLES H. KENRICH, citizens of the United States, and residing at Onaway, county of Presque Isle, State of Michigan, have invented certain new and useful Improvements in Steering-Wheels, of which the following is a specification.

The present invention relates to improvements in steering wheels particularly of the character which are employed in motor vehicles and which comprise a rim, generally made of wood, and a metal spider or frame.

The particular object of the invention is to provide a construction which will be very durable and not liable to have its parts injured by exposure, or to become accidentally separated or detached.

In the accompanying drawing—

Figure 1 is a plan view of a wheel constructed in accordance with the present invention;

Fig. 2 is a sectional view on an enlarged scale through the joint between one of the arms of the supporting frame and the rim;

Fig. 3 is a section on the line 3—3 of Fig. 2;

Fig. 4 is a sectional view on the line 4—4 of Fig. 1;

Fig. 5 is a plan showing a slightly modified form of the invention;

Fig. 6 is a sectional view, on an enlarged scale of the meeting ends of two sections of the rim and the connection therewith of one of the frame arms, said section being substantially on the line 6—6 of Fig. 7;

Fig. 7 is a sectional view on the line 7—7 of Fig. 5.

Referring to the drawings it will be seen that the wheel comprises a circular rim formed of a plurality of segmental sections A, A′ and a supporting spider or frame B, the arms of which are rigidly connected with the rim.

As shown, the rim is formed of two similar semi-circular sections, the ends of which abut in the line of diametrically opposite arms $b$, $b'$ of the spider B.

In the form of the invention shown in Figs. 1 to 4 inclusive, the arms $b$, $b'$ of the spider or supporting rim, which is ordinarily made of metal, terminate in sleeves C which receive and surround the adjacent rim sections A, A′.

As shown in Fig. 2 the sleeves C are interiorly shaped to provide two oppositely tapering sockets having flaring mouths. The walls of the sockets are of slightly less width adjacent the flaring mouths than at their inner ends and the reduced ends $a$, $a'$ of the rim segments are expanded into close engagement with the walls of said sockets by wedges D.

The arms $b^2$, $b^3$, intermediate of those which connect the ends of the rim segments, terminate at their outer ends in expanded portions $b^4$, the upper faces of which are slightly concave so as to fit close against the adjacent surface of the rim. T-shaped bolts E are passed through the rim and screwed into suitable threaded sockets or passages in the expanded members $b^4$, so that the arms $b^2$, $b^3$, are rigidly secured to the rim.

In the embodiment of the invention illustrated in Figs. 5 to 7 inclusive, the rim comprises two similar sections A, A′ and each of the arms of the spider or supporting frame terminates in an expanded portion which is provided with a concave upper face to conform with the adjacent surface of the rim. The expanded portion of the arms $b$, $b'$ is of greater length than the corresponding portions of the arms $b^2$ $b^3$, so that two bolts E are provided to connect said sections $b^5$ with the two segments of the rim. Preferably also a metal plate G is placed across the upper surface of the meeting ends of the rim sections and provided with suitable passages through which said securing bolts E extend. In the embodiment of the invention illustrated in Figs. 5 and 6, the meeting ends of the rim segments are provided with interfitting wedge shaped parts instead of merely abutting as in the form shown in Figs. 1 and 2.

While in the embodiment of the invention illustrated the rim is shown as comprising but two sections and the spider or supporting frame as having but four arms, it will be evident that the number of arms of the spider may be varied, and the number of segments composing the rim may be increased without departing from the spirit of the invention.

An important feature of the invention is that each of the rim segments is formed of a single solid piece of wood. In prior constructions it has been customary to employ rims composed of two or more layers or thicknesses of wood united by glue. Under the action of the elements, however, it is found difficult to maintain tight joints between the different layers and the result is that the rims frequently become cracked, or the layers thereof separate. This difficulty is entirely avoided by the present invention in which each of the rim sections is a single solid piece.

As shown in the cross sectional views, the heads of the connecting screw bolts E which are bent over after being screwed to the spider, and the expanded portions of the rims of the spider engaged by said bolts, are so shaped that they project but slightly from the surface of the rim which is made of substantially uniform shape throughout.

Having thus described the invention what is claimed as new and desired to secure by Letters Patent is:

1. A steering wheel comprising a rim formed of two, substantially semi-circular, members, and a spider or frame having diametrically opposite arms terminating in sleeves that receive and surround the adjacent ends of the rim members.

2. A steering wheel comprising a rim formed of a plurality of segmental members arranged end to end, and a spider or frame having arms terminating in sleeves that each receive and surround the adjacent ends of two of the rim members, and means for locking said sleeves to the rim.

3. A steering wheel comprising a rim formed of a plurality of segmental members arranged end to end, a spider or frame having arms provided at their outer ends with sockets receiving the adjacent ends of two of the rim members, the walls of said sockets being inclined or tapered, and means for expanding the ends of the rim members into close engagement with said sockets.

4. A steering wheel comprising a rim formed of two, substantially semi-circular, members, and a spider or frame having diametrically opposite spokes terminating in laterally extending sockets that receive the adjacent ends of the rim members, and intermediate arms each attached to one of the rim members.

5. A steering wheel comprising a rim formed of a plurality of segmental members arranged end to end, a spider having arms terminating in sleeves forming oppositely tapering sockets that receive and surround the adjacent ends of two rim members, and means for securing said sleeves to the rim members.

6. A steering wheel comprising a rim formed of a plurality of segmental members, and a spider or frame having two of its arms each secured to two of the rim members, and T-headed screw bolts each extending through a member of the rim and screwed into an arm of the spider, the heads of said bolts being bent over the adjacent surface of the rim.

In testimony whereof we affix our signatures.

O K SNYDER.
CHARLES H. KENRICH.